United States Patent
Reale et al.

(10) Patent No.: US 6,871,405 B2
(45) Date of Patent: Mar. 29, 2005

(54) RECIPROCATING SAW BLADE EXTENSION WITH LATERAL OFFSET

(76) Inventors: George S. Reale, 3444 Marshall Rd., Drexel Hill, PA (US) 19026; Paul F. Wolf, 3775 Sablewood Dr., Doylestown, PA (US) 18901

(*) Notice: Subject to any disclaimer, the term of this patent is extended or adjusted under 35 U.S.C. 154(b) by 0 days.

(21) Appl. No.: 10/453,109

(22) Filed: Jun. 3, 2003

(65) Prior Publication Data
US 2004/0003504 A1 Jan. 8, 2004

Related U.S. Application Data

(60) Provisional application No. 60/392,837, filed on Jul. 2, 2002.

(51) Int. Cl.[7] .............................................. B27B 19/00
(52) U.S. Cl. ..................................... 30/392; 30/277.4
(58) Field of Search ............................... 30/277.4, 329, 30/332, 337, 339, 392, 393; 83/699.21

(56) References Cited

U.S. PATENT DOCUMENTS

| | | | |
|---|---|---|---|
| 1,905,482 A | * | 4/1933 | Magri ........................... 30/519 |
| 2,954,808 A | * | 10/1960 | Sweeney et al. ............... 30/375 |
| 3,028,890 A | | 4/1962 | Atkinson et al. |
| 3,260,290 A | | 7/1966 | Happe et al. |
| 3,360,021 A | * | 12/1967 | Mejia ........................... 30/375 |
| 4,553,306 A | | 11/1985 | Mineck |
| 4,566,190 A | | 1/1986 | Isakson |
| 5,809,657 A | | 9/1998 | Mortensen |
| 6,550,147 B1 | * | 4/2003 | Fishlock et al. ............... 30/375 |
| 2004/0221461 A1 | * | 11/2004 | Knisley et al. ................ 30/392 |

* cited by examiner

*Primary Examiner*—Hwei-Siu Payer
(74) *Attorney, Agent, or Firm*—Duane Morris LLP

(57) ABSTRACT

An extension is attachable to the driving shaft of a reciprocating blade tool such as a saber saw. The extension is attached to the drive shaft and the blade is attached to the end of the extension. The extension places the blade at a position spaced laterally and longitudinally from the nominal point of attachment of the blade to the driving shaft, the lateral spacing placing the new blade position approximately at the lateral outside edge of the tool housing, thereby permitting flush cuts. The extension can be formed of an integral strip or sheet having a proximal leg, an intermediate section and a distal leg, joined at equal and opposite obtuse angles. The angles are reinforced by two or more webs bent from the plane of the legs and attached, for example by welding, to the intermediate section.

9 Claims, 3 Drawing Sheets

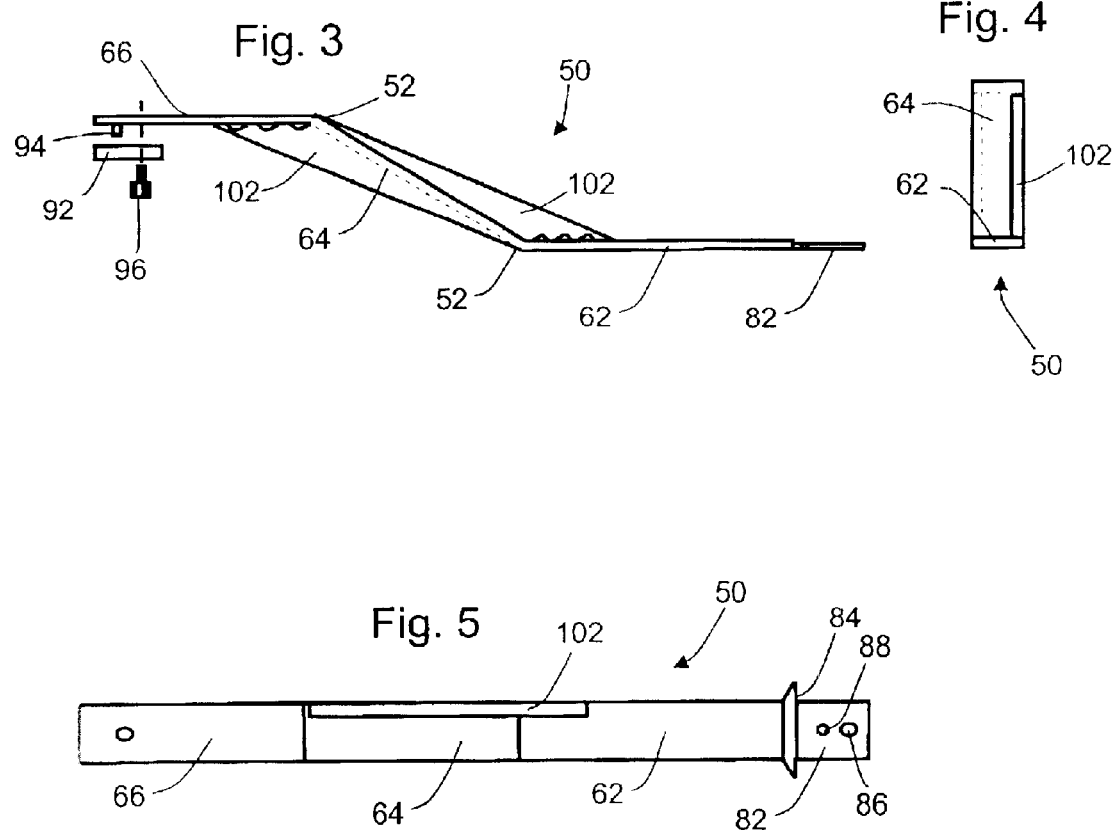

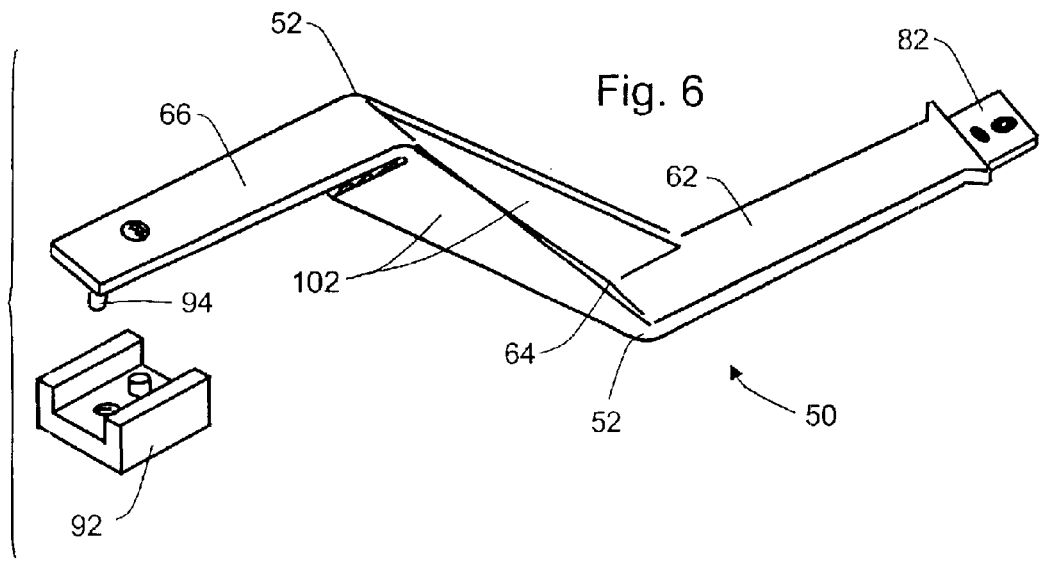
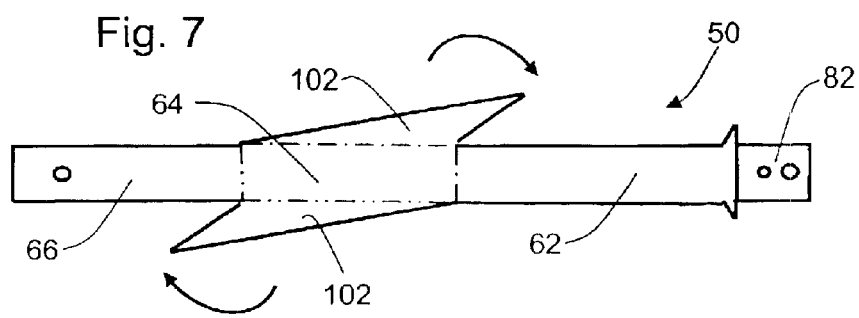

RECIPROCATING SAW BLADE EXTENSION WITH LATERAL OFFSET

CROSS REFERENCE TO RELATED APPLICATION

This application claims the priority of U.S. Provisional Patent Application Ser. No. 60/392,837, filed Jul. 2, 2002.

BACKGROUND OF THE INVENTION

1. Field of the Invention

The invention concerns a blade mounting extension for a reciprocating saw such as a portable handheld electric saw. The blade mounting attaches at one end to a conventional flat saw blade and attaches at an opposite end to the conventional blade mounting fixture that otherwise would receive the saw blade. The inventive extension places the centerline of the saw blade at a lateral offset from the centerline of the blade mounting fixture, as well as spacing the blade linearly from the mounting fixture.

2. Prior Art

A range of portable power tools provide for reciprocating motion and typically are powered electrically or pneumatically. The driving portion of such a power tool has a housing that requires a considerable lateral width and height, as well as depth in the direction of reciprocation, to support, guide and drive the shaft that carries the reciprocating element. An electric reciprocating tool, for example, typically has a rotating-armature electric motor and an eccentric crank or cam arrangement for converting rotation of the motor into reciprocation of a fixture to which one end of the working tool element, such as a serrated saw blade, is attached.

There are a number of popular power tools, variously known as scroll saws, saber saws, jig saws, hole saws, etc., that reciprocate elongated blades. Some such saws have blades that are placed near a front end of a housing that is mounted above a support plate. The housing is elongated in one direction and the blade extends perpendicular to the elongation of the housing. Another popular form has a housing that is elongated in the same direction as the longitudinal extension of the blade. Both types of saws usually have a gripping handle on the housing on a side opposite from the blade, the handle being parallel to the normal cutting direction. In some arrangements, the blade can be oriented selectively to face its cutting edge one direction or another relative to the housing, e.g., forward or backward or laterally.

In addition to the drive shaft for attachment of the blade or other working element, the housing carries the power generation element (e.g., electric motor), the mechanical supporting bushings for the reciprocating drive shaft, and any associated linkage and gearing parts. These provisions space the drive shaft from some or all of the outer surfaces of the housing of the tool. The drive shaft is typically centered between lateral outside surfaces of the housing. As a result, the longitudinal center line of the blade, corresponding to the line that is cut by the saw, is often located along a center line of the housing. Even if offset, the drive shaft axis generally is not placed at or near the lateral outside edge of the tool. As a result, the housing of the tool can interfere with positioning of the blade in connection with some desirable cutting situations.

Interference due to the saw housing is apparent in the example of making a flush cut on a surface. Assuming that a structure protruding from a surface is to be cut off flush with the surface, the saw blade needs to be oriented parallel with the surface and placed directly against the surface, so as to make a cut immediately along the surface at the proximal part of the protruding structure. If a blade that is centered between lateral sides of a housing having a given width, should be brought parallel to a surface, the closest that the blade can come to the surface is a distance equal to the spacing between the blade and the lateral outside of the housing. If the blade is centered, this distance is half the width of the housing, e.g., several cm.

As a result of potential interference due to the width of the housing, the operator may attempt to incline the tool housing and lay the blade laterally against the surface while causing the blade to bend. This is wearing on the blade, which advantageously should be disposed in a straight line, to bear the alternating tension and compression forces caused by the reciprocating sawing motion, rather than being caused to flex. Bending the blade to cut also is hard on the tool, applying off center forces to the drive shaft, to the mounting of the blade to the drive shaft as well as the mounting of the drive shaft in the tool.

Attempting a flush cut by inclining the tool also often does not result in a clean flush cut. The result may be an inclined cut or stub rather than a neat flush cut. The surface adjacent to the protrusion may be marred. What is needed is a way to align the operating position or cutting line of the blade with the lateral outer edge of the housing that carries the driving mechanism for the blade, even in a tool that has a cutting line spaced well inwardly from the lateral side of the housing, while driving the blade in a straight reciprocating motion.

In a saw of the type having a blade that is elongated perpendicular to the elongation of the housing, the blade driving shaft can be placed near the front or nose of the tool, as typified by U.S. Pat. No. 4,566,190—Isakson. This placement is helpful to enable cutting close to an abutment, at least if the blade can be re-oriented parallel to the abutment. The driving shaft is still spaced inwardly from the closest edge (the nose) at least by the thickness of the bushing carrying the driving shaft. In order to align the blade cutting line with the outside of the housing at the nose, a support block is provided at the end of the driving shaft, for a screw or clamp fixture positioning the blade at a space from the remaining surface of the driving shaft. Isakson has a solid support block mounted on the end of the reciprocating driving shaft, the blade being fastened on an outer face of the block and thus spacing the cutting line of the blade from a cylindrical projection of the surface of the driving shaft. Another sort of solid block is disclosed in U.S. Pat. No. 4,553,306—Mineck. In U.S. Pat. No. 3,028,890—Atkinson et al., the blade is attached to the drive shaft on the outside of a square tube. The square tube provides at least two optional orientations for the blade, both spaced from the projection of the driving shaft. Atkinson also teaches a laterally asymmetrical housing so that from the outset the driving shaft is placed closer to one of the laterally opposite sides of the housing than to the other.

Mounting the blade on a cutting line that is laterally spaced from the reciprocating driving shaft has some of the same problems as attempting to tilt the saw at an incline in order to make a flush cut. The reciprocating forces associated with moving the blade in a sawing motion are transmitted in part as lateral and bending forces on the drive shaft and its mounting. The resultant force includes torque applied to the end of the driving shaft around a torque axis perpendicular to the longitudinal axis of the driving shaft. The severity of this torque is proportional to the lateral spacing of the blade center line from the drive shaft axis, this lateral spacing equating with the length of a lever arm. As the saw reciprocates, torque is applied in alternating directions.

U.S. Pat. No. 5,809,657—Mortensen teaches a blade adaptor that displaces the cutting line of a blade forward from the nose of a saw of the type having a blade aligned perpendicular to and at the front or nose of the housing. The blade is parallel to the drive shaft but is spaced by a distance of at least several cm. forward from the drive shaft. The adaptor forms more or less of a right angle or L-shape. The offset distance (the foot of the L-shape) defines a moment arm. Reciprocation forces applied to the blade by cutting are translated into a rocking or bending action at the connection to the drive shaft with a lever or multiplying factor proportional to the offset distance. These forces wear and loosen the clamping mechanism, screws or other mechanical device used for attachment at the drive shaft. The forces also wear and loosen the mounting of the drive shaft and the mechanism by which the tool drives the blade. These forces produce friction and metal fatigue and generally reduce the useful life of the tool.

In U.S. Pat. No. 3,260,290—Happe et al., a blade adaptor attachment holds the blade laterally alongside and outside of the width of the tool housing. The offset in this case is by an even greater distance than the nose-forward offset in Mortensen. Happe addresses the leverage of the reciprocation force by providing a guide shaft in addition to the drive shaft. The driving shaft and guide shaft are parallel and spaced. This solution reduces flexing at the attachment of the adaptor to the reciprocating drive shaft, but it requires a special non-standard tool effectively having two parallel shafts to guide the blade. The use of two shafts increases operational friction. The leveraged torque from the offset remains a factor, even if better borne by two shafts than by one as in Mortensen. The torque tends to produce alternating racking of the two parallel shafts, instead of flexing specifically at the attachment of the adaptor to the drive shaft.

It would be advantageous to provide a flush cutting blade rig that can be used on any reciprocating blade tool. Many popular reciprocating blade tools have a substantial distance between the drive shaft and the lateral edge of the housing and are not generally designed for flush cutting. It would be advantageous to adapt them for flush cutting, but not to damage the tool as a result. A laterally offset fixture is needed that positions the blade at a sufficient distance from the drive shaft to enable flush cutting with most types of tools, yet attaches to the tool simply, preferably with no more complication than attaching the blade to the driving shaft. Having made such an attachment, provisions need to be made somehow to minimize or reduce the adverse effects of the flexing and racking forces that could be produced by torque leveraged according to the distance at which the blade is offset from the driving shaft.

SUMMARY OF THE INVENTION

It is an object of the invention to provide a blade mounting for a reciprocating-blade power tool that addresses the problems caused by placing the center or cutting line of the blade parallel to and offset from the axis of the reciprocating shaft that drives the blade.

More particularly, it is an object to deal with the leverage and flexing that can be applied to the driving shaft or to the joint of attachment with the driving shaft, by a generally L-shaped offset mounting.

It is a further object to provide a blade mounting adapter having these beneficial aspects, in a substantially universally applicable structure that attaches to virtually any tool by virtue of a blade-receiving fixture at one end and a blade-mimic structure that attaches to the drive shaft at an opposite end.

These and other objects are met by an extension that is attachable to the driving shaft of a reciprocating blade tool such as a saber saw. The extension is attached to the drive shaft and the blade is attached to the end of the extension. The extension places the blade at a position spaced laterally and longitudinally from the nominal point of attachment of the blade to the driving shaft, the lateral spacing placing the new blade position approximately at the lateral outside edge of the tool housing, thereby permitting flush cuts. The extension can be formed of an integral strip or sheet having a proximal leg, an intermediate section and a distal leg, joined at equal and opposite obtuse angles. The angles are reinforced by two or more webs bent from the plane of the legs and attached, for example by welding, to the intermediate section.

According to an inventive aspect, in addition to providing a lateral offset as described, the invention displaces the point of attachment of the blade longitudinally from the drive shaft as well. This displacement tends to remove and isolate the drive shaft and its attachment from some of the flexing and racking force, by reducing to less then 90 degrees the resultant angle at which torque-producing reciprocating sawing forces are applied at the connection between the extension and the driving shaft.

According to another aspect, the invention employs a preferably-integral adapter bar having two complementary angles that place the blade-receiving end parallel to and laterally displaced from the drive-shaft attaching end, these angles being reinforced by structures extending between the legs leading up to the angle. In a preferred arrangement, integral reinforcing webs are bent upwardly from the material of the adapter bar to reside in the crotches of these angles. The angles are preferably obtuse angles that provide part of the longitudinal displacement described above. The reinforcing webs preferably are welded along their free ends to laterally displace proximal and distal extension legs that are parallel to one another and laterally displaced.

The attachment structures at the proximal and distal ends of the extension are precisely complementary to the drive shaft end and to the blade. One end substantially duplicates the proximal end of a saw blade. The other end substantially duplicates the structure of the drive shaft that normally receives the saw blade. As a result, the blade extension attaches to the drive shaft in the same manner that a blade otherwise could attach normally. In turn, the blade attaches to the opposite end of the extension in the same way that the blade would otherwise attach to the drive shaft.

A number of additional objects and aspects of the invention will become apparent in connection with the following discussion of examples and preferred embodiments.

BRIEF DESCRIPTION OF THE DRAWINGS

There are shown in the drawings a number of preferred arrangements that should be construed as exemplary rather than limiting. In the drawings.

FIG. 3 is a plan view corresponding to FIG. 2, showing the extension of the invention with the saw blade receiving fixture exploded.

FIG. 4 is an end elevation view thereof.

FIG. 5 is a side elevation view.

FIG. 6 is a perspective view corresponding to FIG. 3.

FIG. 7 is a plan view of a flat blank to be bent upwardly (dash-dot lines) and downwardly (dash-double-dot) into the extension shape as otherwise shown.

DETAILED DESCRIPTION OF THE PREFERRED EMBODIMENTS

According to the invention an extension is attachable to the driving shaft of a reciprocating blade tool such as a saber saw. The extension is inserted between the normal connection for the blade, namely the reciprocating driving shaft, and the blade. That is, the extension is attached to the drive shaft and the blade is attached to the end of the extension. This is accomplished using structures for the opposite ends of the extension that resemble the structures of the blade and its point of drive shaft attachment, and which form a rigid extension that positions the blade at a longitudinal and lateral distance from its nominal directly-attached position on the reciprocating driving shaft of the tool.

Figure 1:
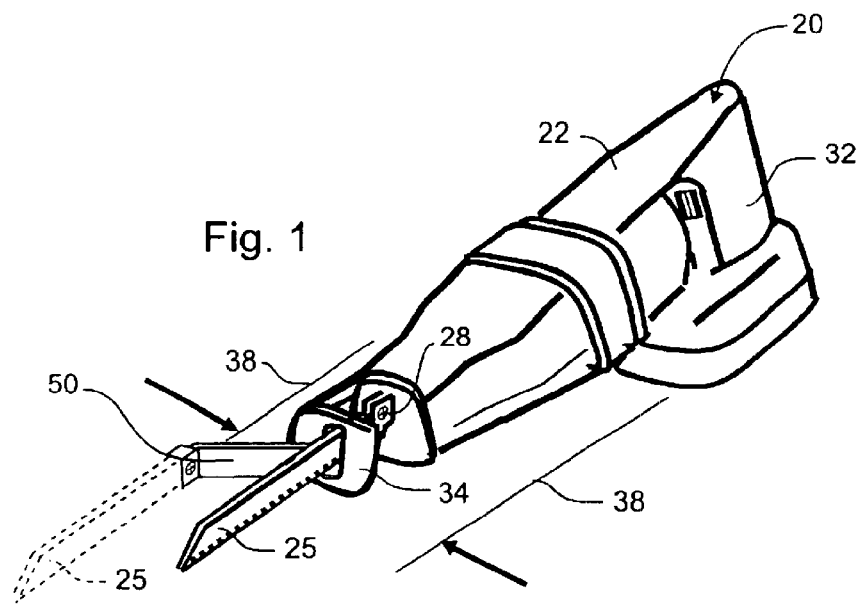
FIG. 1 is a perspective view showing a reciprocating saw having a conventional blade and showing the blade extension of the invention disposed to receive an offset blade shown in broken lines.

FIG. 1 illustrates an exemplary form of reciprocating blade tool 20. The tool has a housing 22 that carries an electric motor, pneumatic piston/cylinder or other mechanical arrangement (not shown) that reciprocates a serrated blade 25, attached to a fitting 28 at the end of a reciprocating driving shaft extending into the housing 22. The reciprocating movement is parallel to a driving shaft 36 (see FIG. 2), which normally corresponds to the longitudinal axis of the blade 25 and defines a driving axis. The tool is generally manipulated manually via a handle 32. The tool can have a presser-foot rest 34 associated with the blade 25, for bracing the tool against a material (not shown) in which a sawed line is to be cut. Alternatively, the tool can be operated with only the blade applied to the work surface to be cut.

The exemplary saw in FIG. 1 is only one of any number of reciprocating tools to which the invention can be applied. Other common forms of such tool are also applicable, for example as in U.S. Pat. No. 3,260,290, with a housing that is elongated in a direction perpendicular to the cutting line of the blade, or as in U.S. Pat. No. 3,028,890, with the blade displaced toward one edge of the tool. The invention is also applicable to those tools, and the tools of the other prior art mentioned above, which is hereby incorporated, and other reciprocating saws and other tools.

Figure 2:
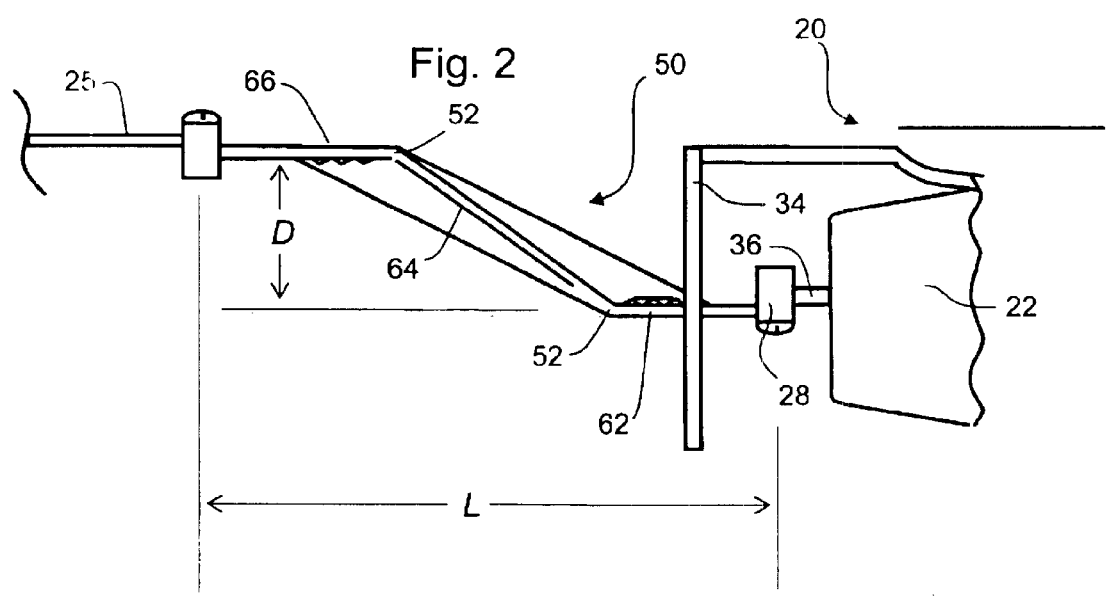
FIG. 2 is a plan view showing the extension of the invention, from above relative to FIG. 1, the blade and the saw housing being shown partly cut away.

Referring to FIGS. 1 and 2, according to the invention an extension 50 is provided between the blade 25 and the fitting 25 at which the blade 28 would otherwise be attached to the driving shaft 36 of the tool 20. The extension 50 re-positions the blade at a position shown in FIG. 2, where the blade is spaced laterally and also longitudinally from the driving shaft 36 and from the nominal position of the blade 25 as shown in solid lines in FIG. 1. Preferably, the lateral spacing places the new blade position nearer to a projection of one of the lateral outside edges 38 of the tool housing 22, or beyond the lateral outside edge 38, or most-preferably in alignment with the lateral outside edge 38. The placement of the blade as shown facilitates flush cutting, and can make flush cutting possible using a tool in which the drive shaft 36 is well back from the housing edge 38 at which a flush cut may be desired.

The longitudinal spacing "L" and lateral spacing "D" between the original and extension-carried position of the blade together serve both to facilitate flush cutting, and also to ease the flexing stress that could be caused by an extension in the shape of a right angle with little or no longitudinal spacing.

As shown in FIG. 2, preferably the longitudinal and lateral spacing are achieved by providing equal and opposite obtuse angles 52 between three integral lengths or sections of the blade extension 50. These sections are a proximal extension leg 62 attached to the drive shaft 36 in place of the blade 25, an intermediate section 64 that is angled relative to the proximal leg by an obtuse angle 52, and a distal extension leg 66 that joined to the intermediate section 64 by an opposite but equal obtuse angle 52. Thus the proximal and distal leg sections are parallel.

The extension 50 can be formed of an integral strip or sheet, i.e., wherein the proximal leg 62, intermediate section 64 and distal leg 66 are formed in one piece. These parts can be stamped from sheet stock, for example steel strip. Alternatively, they can be cast in a metal or other material (e.g., rigid plastic). Although preferably integral, the legs and intermediate section can be joined by welding.

FIGS. 3–5 show a preferred integral metal arrangement in elevation and plan views. The extension 50 is discussed with respect to certain terms that denote orientations and directions, such as "up," "down," "above," "below," "vertical," "horizontal," etc. These terms refer to the depiction in the drawings and should not be construed to require any particular orientation or relative position of the extension, absolutely or relative to a tool housing, unless so stated or unless necessary in view of the operation of the structure being discussed.

As shown in FIGS. 2 and 3, the opposite obtuse angles can be on the order of 120 to 150 degrees, for example. The proximal and distal legs can be of equal or different length, and can be the same or a different length from the intermediate section. In the embodiment shown in FIGS. 3–5, the proximal leg is somewhat longer than the distal leg and has a structured end tab 82 that resembles the end of a blade (not shown). The end tab 82 thus has a shoulder-forming lateral part 84 leading into the tab 82, which can be thinner than the remainder of the extension material to equal the thickness of a blade. The tab 82 has the same connecting structures as a blade, two holes 82, 88 being shown in FIG. 5.

The distal leg section 66 has a structure that corresponds to the blade-receiving structure on the end of the drive shaft 36 (see FIG. 2), and is complementary with the holes 86, 88 in FIG. 5. Thus as shown in FIG. 3, a clamping plate 92 is provided to attach the blade to the distal leg 66. The blade (not shown) has two holes positioned the same as holes 86, 88 in FIG. 5. One of the holes 86 receives a locating pin 94. The other hole receives a screw 96 that is passed through plate 92 and threads into a corresponding hole in the distal leg 66 to clamp the blade (not shown) to the extension. FIG. 6 further illustrates these aspects in a perspective view.

As shown in FIGS. 3–6, the extension 50 is made rigid through one or preferably both of the obtuse angles 52 by means of at least one reinforcing portion 102 that extends between the intermediate extension section 64 and one of the proximal and distal extension legs 62, 66. The reinforcing portion 102 rigidly spaces the intermediate extension section 64 from said one (or both) of the proximal and distal extension legs 62, 66, at a space from a respective one of the obtuse angles 52. In the preferred embodiment, two such reinforcing portions 102 respectively extend between the intermediate extension section 64 and each of the proximal extension leg 62 and the distal extension leg 66.

FIGS. 3, 6, and 7 show the preferred arrangement in which the intermediate and leg parts of extension 50 are integral with one another and also integral with the reinforcing portions 102. These parts can be cast, but preferably are stamped from a steel strip, the obtuse angles 52 being formed and the reinforcing portions 102 being bent up 90 degrees from the plane of the sheet so as to reside in the obtuse angles. As shown by the flat blank in FIG. 7, the reinforcing portions 102 can be lateral wings on the intermediate section. The reinforcing portions are bent in opposite directions to 90 degrees from the plane of the intermediate section 64, and the proximal and distal legs are likewise bent in the same directions, but only to the obtuse angle. This places the ends of the reinforcing portions on the inside of the obtuse angle 52 and abutting the respective leg 62 or 66.

The reinforcing portions could be merely placed into obtuse angles 52 and in that position would resist the tendency of the obtuse angles 52 to be collapsed by compression between the proximal and distal legs 62, 66. However, preferably the reinforcing parts are welded to the adjacent proximal or distal leg. In that way, the reinforcing portions resist both tension and compression forces applied in reciprocation of the tool drive shaft, versus resistance at the blade.

The reinforcing portions 102 in the embodiment shown provide triangular webs that rigidly resist extension or collapse of the obtuse angles. Reciprocation forces produced at the drive shaft and resisted at the blade produce tension and compression between the ends of the extension 50. However, this does not result in extension and compression of the length of the extension because the reinforcement portions 102 hold the obtuse angles 52 rigidly in at their predetermined angle. There is some tendency for opposite forces at the blade and at the driving shaft compression and extension to produce torque at the points of affixation of the extension on the driving shaft and the blade on the extension. Whereas the obtuse angles space the blade longitudinally as well as laterally, this effect is less severe than it would be if the two angles 52 were each right angles. The two angles 52 can be made more obtuse to enhance the elongation of the extension and the resulting isolation from torque, or shorter if some flexing is to be permitted in exchange for a shorter total length.

The device of the invention is thus seen to provide an extension blade holder to be mounted between the conventional blade holder of a reciprocating saw or similar tool, and the blade or other working member. The device has a proximal end that resembles the end of the saw blade and is attached in the same way to the blade mounting shaft of the saw. The device has an identical mounting at its distal end, for attaching the blade. Assuming that the saw blade is in a vertical orientation, the extension holder of the invention positions the mounting point for the blade, for example, about 5.5 inches below or longitudinally displaced from the nominal position that would be provided by the blade holder of the saw. The holder has two angular diversions that are equal angles and bend in opposite directions, defining a diversion that displaces the plane of the blade laterally. The lateral spacing is preferably sufficient to equal or exceed the distance from the cutting line of the blade as attached to the driving shaft, to the lateral outside edge of the tool housing. Typically, this distance is about two inches. These distances are scalable and variable to reflect the scale of the power tool or to enhance or reduce the application of forces expected in operation. In this way, the blade is operated at a position parallel to its nominal mounting position and preferably bordering or outside the footprint of the housing, enabling flush cuts.

The lateral and longitudinal offsets are provided by two angular diversions that are equal and opposite obtuse angles, e.g., at least 120 degrees. In exerting a reciprocating force on the blade, the lateral offset between the plane of the saw shaft and the plane of the blade, which would tend to seriously flex the extension blade holder and its attachments if coupled at right angles, is prevented from flexing or at least substantially controlled. The obtuse angles result in longitudinal as well as lateral spacing of the point at which blade reciprocation forces are applied (in a direction parallel to the blade cutting line). The result is a reduction in the stress of flexing as compared to a right angle connection, due to lowering the moment arm at which flexing torque is applied to the connection with the driving shaft, to much less than 90 degrees.

The blade holder is made integrally from a durable steel bar stock, about an eighth of an inch thick and a half inch wide. Both angular diversions are reinforced by triangular webs of integral steel, folded to 90 degrees from the plane the extension and optionally welded. Other materials are possible. For example a similar shape could be cast.

The invention having been disclosed in connection with certain preferred examples, variations employing the inventive aspects will now be apparent. The invention is not limited only to the examples discussed above, and reference should be made to the appended claims instead of the foregoing examples, to assess the scope of the invention in which exclusive rights are claimed.

What is claimed is:

1. A power tool apparatus for a power tool having a drive shaft carried in a tool housing, for receiving and driving a saw blade in a reciprocating motion on a drive axis, the apparatus including a blade extension comprising:
   a distal extension leg structured for attachment of the saw blade to the distal extension leg;
   a proximal extension leg for attachment to the drive shaft in place of the saw blade;
   an intermediate extension section disposed between the proximal extension leg and the distal extension leg;
   wherein the distal extension leg positions the saw blade at a cutting axis that is laterally displaced from the drive axis;
   wherein the proximal extension leg and the distal extension leg are parallel to one another and joined at angles to the intermediate extension section; and,
   further comprising at least one reinforcing portion extending between the intermediate extension section and one of the proximal and distal extension legs, the reinforcing portion rigidly spacing the intermediate extension section from said one of the proximal and distal extension legs.

2. The apparatus of claim 1, wherein the lateral displacement of the cutting axis from the drive axis is at least as large as a distance from the driving axis to a lateral outside wall of the housing, whereby the cutting axis can be placed flush with a surface against the housing.

3. The apparatus of claim 1, wherein the proximal extension leg is structured substantially the same as a saw blade and is attachable to the driveshaft substantially the same as the saw blade.

4. The apparatus of claim 3, wherein the distal extension leg is structured substantially the same as the driveshaft for receiving said saw blade.

5. The apparatus of claim 1, comprising two said reinforcing portions respectively extending between the intermediate extension section and one of the proximal extension leg and the distal extension leg, the two reinforcing portions rigidly spacing the intermediate extension section from each of said the proximal and distal extension legs, at a space from a respective one of the angles at which the intermediate extension section is joined to the proximal and distal extension legs, respectively.

6. The apparatus of claim 5, wherein the proximal and distal extension legs and the two reinforcing portions are integral portions of a sheet of material, the reinforcing portions being bent to diverge from a plane occupied by one of the extension legs and the intermediate extension section integrally coupled to a respective one of the reinforcing portions.

7. The apparatus of claim 1, wherein the proximal and distal extension legs and the reinforcing portion are integral portions of a sheet of material, the reinforcing portion being bent to diverge from a plane occupied by one of the extension legs and intermediate section.

8. The apparatus of claim 7, wherein the reinforcing portion is integrally connected along a fold at one side and at a weld at an other side, between said intermediate section and an adjacent one of the extension legs.

9. The apparatus of claim 8, wherein two reinforcing portions are respectively coupled at folds to the proximal and distal extension legs on laterally opposite sides of the extension legs, and are bent perpendicular to planes of said extension legs and welded to the intermediate section.

* * * * *